United States Patent
Kirschner

(10) Patent No.: US 12,134,327 B2
(45) Date of Patent: Nov. 5, 2024

(54) FUNCTION EXTENSION MODULE FOR CHARGING STATIONS

(71) Applicant: AUDI AG, Ingolstadt (DE)

(72) Inventor: Sebastian Kirschner, Ingolstadt (DE)

(73) Assignee: AUDI AG, Ingolstadt (DE)

(*) Notice: Subject to any disclaimer, the term of this patent is extended or adjusted under 35 U.S.C. 154(b) by 526 days.

(21) Appl. No.: 17/521,971

(22) Filed: Nov. 9, 2021

(65) Prior Publication Data

US 2022/0266705 A1    Aug. 25, 2022

(30) Foreign Application Priority Data

Feb. 23, 2021 (DE) .......................... 102021104259.3

(51) Int. Cl.
| | |
|---|---|
| *H01M 10/46* | (2006.01) |
| *B60L 53/16* | (2019.01) |
| *B60L 53/30* | (2019.01) |
| *B60L 53/66* | (2019.01) |
| *B60L 53/68* | (2019.01) |
| *H01R 13/422* | (2006.01) |
| *H01R 13/717* | (2006.01) |

(52) U.S. Cl.
CPC ............ *B60L 53/16* (2019.02); *B60L 53/305* (2019.02); *B60L 53/66* (2019.02); *B60L 53/68* (2019.02); *H01R 13/422* (2013.01); *H01R 13/7175* (2013.01); *H01R 2201/26* (2013.01)

(58) Field of Classification Search
CPC .......... B60L 53/68; B60L 53/16; B60L 53/66; B60L 53/305; H02J 7/0048; H02J 7/0042; H01R 2201/26; H01R 13/422; H01R 13/7175; H01R 13/6683
USPC ................. 320/104, 107, 109, 114, 132, 149
See application file for complete search history.

(56) References Cited

U.S. PATENT DOCUMENTS

2010/0114798 A1    5/2010  Sirton
2013/0321024 A1*  12/2013  Muller ................... B60L 53/52
                                                       324/764.01

FOREIGN PATENT DOCUMENTS

| DE | 102012108674 A1 | 3/2013 |
| DE | 102017209718 A1 | 12/2018 |
| KR | 20170072992 A | 6/2017 |

OTHER PUBLICATIONS

Machine translation of DE102012108674A1 (Mar. 28, 2013) (Year: 2013).*
German Examination Report issued on Aug. 17, 2021 in corresponding German Application No. 102021104259.3; 8 pages; Machine translation attached.

* cited by examiner

*Primary Examiner* — Edward Tso
(74) *Attorney, Agent, or Firm* — Maier & Maier, PLLC

(57) ABSTRACT

A function extension module for charging stations and a method for its operation.

19 Claims, 3 Drawing Sheets

FUNCTION EXTENSION MODULE FOR CHARGING STATIONS

FIELD

The invention relates to a function extension module for charging stations and a method for its operation.

BACKGROUND

Currently, electrically powered vehicles that can be charged externally (e.g. PHEV, BEV) are predominantly charged via AC ("Alternating Current") and DC ("Direct Current"). AC charging is preferred especially where vehicles have longer standing times (at home, at work, etc.), since the charging power (typ: 3.3 kW-22 kW) is lower than for DC charging. Direct current is used to charge vehicles mainly at locations where faster charging is required and when for example longer distances have to be covered (charging powers from 50 kW). These are special charging points with fixed charging stations, for example at freeway services, shopping, etc.

Several tools assist the driver in finding a next charging point. Using a mobile application or a human-machine interface (MMI) in the vehicle, one can search for charging stations, charging type, charging plug and a minimum charging power based on the route or at the desired destination. Newer vehicle systems automatically determine which charging stations to give preference to, based on the vehicle's route and energy consumption, to ensure the most efficient or rapid travel.

Most charging stations currently do not transmit a status to a central system (e.g., a database server) that the driver, a mobile application, or an in-vehicle computing system could use to check whether a charging station is occupied and when it is expected to be free again. Some charging stations do not technically have connectivity (e.g., Internet connection) to a central service provider, i.e., they are not able to provide corresponding information. For charging stations that are already technically equipped for this purpose, there is little effort on the part of some operators to make this data available, as it incurs additional costs. Because this information is not available, it often happens that vehicles that have previously charged or are still charging occupy charging points. Customers often want the option of reserving a charging station, which is not possible due to the lack of connectivity between charging stations. The disadvantages described contribute to the fact that potential buyers are still reluctant to purchase electrically powered vehicles for fear of being stalled or that a trip could take a very long time due to the inability to estimate an exact loading time.

DE 10 2017 209 718 A1 concerns an adapter device for a charging device of a motor vehicle. The adapter device has a measuring unit and a communication unit. The measuring unit is arranged to determine a power value of an electric charging power transmitted from a charging infrastructure to the motor vehicle via the adapter device, and the communication unit is arranged to transmit the power value to a central control unit and to receive a target power value from the control unit. The adapter device has a signal manipulation unit that is arranged to change a coordination signal sent from the charging infrastructure via the adapter device to a charging interface of the motor vehicle, which signals a maximum charging power, or to replace it with a substitute coordination signal in such a way that the adapter device signals the target power value to the motor vehicle as the maximum charging power.

KR 2017 0072992 A relates to a charging cable control device for electric vehicles that manages information about charging faults that occur during charging of electric vehicles. In a power charging control system for electric vehicles, charging information is collected while the electric vehicle is charging to determine if a fault occurs while the electric vehicle is charging. When a fault occurs, charging information is transmitted from the charging cable control device to a repair station terminal via a server in a wireless communication process.

US 2010/114798 A1 discloses a charging system with charging points comprising sockets and a communication module, and an intermediary server comprising a database, an application, and a graphical user interface. The intermediary server is connected to the charging points, users, and public utilities and power providers. Each charging point is arranged to allow vehicles, pair the charger to the outlet, and send vehicle data to the intermediary server. The intermediary server processes vehicle data, user data, and public utility and electricity provider data, and calculates a vehicle priority and charge distribution based on the number of vehicles at the charging point and on the processed data.

SUMMARY

Against this background, the object of the invention has been to provide devices and methods with which the operation of a charging infrastructure comprising a plurality of charging points can be optimized and the time required for the user of an electric vehicle to find a suitable charging point can be minimized.

According to the invention, the task is solved by devices having the features of claims 1 and 9 and a method having the features of claim 10. Embodiments and further developments of the invention are apparent from the dependent claims, the description and the figures.

The subject matter of the invention is an adapter that extends the functions of a charging station (FEM adapter). The FEM adapter comprises a receptacle for a charging plug of the charging station, a plug for plugging into a charging socket of a motor vehicle, a current/voltage measuring unit and a telecommunications unit arranged for wireless data exchange with a server. The telecommunications unit can transmit and receive data. The telecommunications unit communicates with a central database server via suitable radio technology. Various information is transmitted to this server, e.g. whether the charging station is occupied, whether charging is in progress and how much time the current charging process will take. In the same way, information can be received via the telecommunications unit, e.g. whether the charging station should be reserved.

According to the invention, the adapter comprises a computing unit that is arranged to determine a charging curve of the motor vehicle from the measured values of the current/voltage measuring unit during a charging process of a motor vehicle connected to the charging station, to calculate a remaining charging time and to transmit it to the server via the telecommunications unit.

The computing unit processes all information and contains various algorithms, which will be discussed in more detail below. An algorithm in the computing unit of the FEM adapter uses the charging current and the charging voltage to determine the charging curve of the vehicle or the high-voltage battery that is currently being charged. This calculation can be used to predict when a charge is expected to end and the charging point is free again for following vehicles. This information is transferred to a central database server, which in turn can be accessed by other applications.

In order to determine the charging curve of the vehicle that is currently being charged, the FEM adapter contains a current/voltage measuring unit with at least one current sensor and one voltage sensor. In one embodiment, the current sensor and the voltage sensor operate according to the Hall principle (contactless current detection via magnetic field generated by a current-carrying conductor), and the current sensor is arranged in the FEM adapter (e.g. around a plug-in contact) in such a way that the charging current of a line (e.g. HV+ or HV−) flows through the sensor. Using the measured current and voltage values, the computing unit can determine how much time a charging process will still take. For this purpose, a charging curve of the currently charging vehicle is calculated. In one embodiment, the algorithm is self-learning, so that the more frequently different vehicles charge at the charging point with the FEM adapter, the more accurate predictions can be made about what course different charging curves will take. The charging curve depends on several factors, e.g. charging voltage, charging current over time, and how the HV battery of the vehicle to be charged degrades the charging current. The remaining loading time is calculated from the determined values and transmitted to the server via the telecommunication module. There, this information can subsequently be retrieved by other systems, for example, to calculate an ideal route for an electric vehicle to be charged.

The FEM adapter according to the invention is plugged onto the charging plug of a stationary charging station and forms a fixed unit with the charging plug. This charging plug adapter unit can then in turn be plugged into a charging socket of a vehicle to be charged. The FEM adapter works completely autonomously and does not need to be wired to the charging station. Plugging it into the charging plug of the charging point completes the installation. The FEM adapter can be equipped with any type of plug, both for DC charging and AC charging, e.g. an ECE CCS type plug (charging mode 4).

In one embodiment, the FEM adapter includes a plug lock controlled by the computing unit with which the adapter is locked to the charging plug to form a fixed unit that can only be released by an authenticated user. To ensure that the FEM adapter and the charging plug form a solid unit, the adapter locks the charging plug via the plug lock, in the same way as the charging plug would be locked in a direct connection between charging station and vehicle. Only an authenticated user (e.g. service personnel) can release this lock. This ensures that the adapter is not removed without permission.

In one embodiment, the FEM adapter includes a position sensor connected to the computing unit. The computing unit is arranged to determine from the data of the position sensor whether the adapter is in or on the charging station or is inserted in a charging socket of a vehicle. This is especially important when a vehicle has actually finished charging, but the plug is still in the vehicle. Due to the lack of current flow, the FEM adapter would otherwise not be able to detect whether the charging point is still occupied.

In one embodiment, the FEM adapter includes a self-sufficient energy storage device for supplying power to the FEM adapter. In another embodiment, the energy storage device can be inductively recharged by the electromagnetic field generated when charging a vehicle (in the charging cable and plug).

In one embodiment, the FEM adapter includes a relay controlled by the computing unit to break an electrical connection of a voltage pin (HV+ or HV−) of the plug for plugging into a charging socket of a motor vehicle.

In one embodiment, the FEM adapter includes an optical signal unit controlled by the computing unit that is arranged to signal whether the charging station is operational and whether the charging station has been reserved for an approaching electric vehicle. In another embodiment, the optical signal unit comprises an LED strip.

Subject of the invention is also to provide a charging infrastructure. The charging infrastructure according to the invention comprises several charging stations with charging plugs equipped with a FEM adapter according to the invention, and a database server arranged for wireless communication with the adapters and with motor vehicles or their users.

Subject of the invention is also to provide methods for operating the FEM adapter according to the invention and the charging infrastructure according to the invention.

In the method for operating the FEM adapter according to the invention, the adapter transmits data to a central database server. The data contains information on whether the charging point to which the FEM adapter is connected is currently carrying out a charging process and, if so, when this is expected to be completed.

With the help of the FEM adapter, a driver or an application can also be given the option of reserving the charging point for a specific period of time. In one embodiment of the method, the FEM adapter receives from the central database server via the telecommunications unit a reservation request for a specific period of time. When such an order is received at the FEM adapter, the optical signal unit is switched on and indicates during this period that the charging point is reserved for an approaching electric vehicle and is not available. At the same time, the current flow to the charging plug is actively interrupted until the vehicle or the driver who has reserved the charging point authenticates himself and can thus start the charging process. For this purpose, a relay in the adapter actively disconnects the electrical connection of a voltage pin (e.g. HV+ or HV) shortly before the reservation time. Disconnecting the circuit makes it impossible for unauthenticated users and vehicles to charge at the charging point. In addition, it is stored on the central server that no other vehicle can be charged at the charging point for a certain period of time during which the vehicle is being charged.

Subject of the invention is also to provide a method for operating a charging infrastructure according to the invention, in which the respective adapters of the charging stations transmit current status information of the respective charging station to the database server, and in which an electric vehicle whose high-voltage battery needs to be charged accesses the database server and retrieves from the database server the position of the nearest charging station available for a charging process.

In the method according to the invention, the FEM adapters of the charging stations transmit current status information (charging point occupied, expected availability, etc.) to the central database server. A vehicle in which the energy in the high-voltage battery is nearing the end can access this data from the database server and thus determine the ideal, nearest charging point. A computing unit (e.g. a navigation system in the vehicle) then automatically determines the route there. The occupied charging points are not even approached.

In a further realization of the method, the calculation of the charging time is performed centrally on the server and not in the computing unit of the FEM adapter. In this case, the FEM adapter transmits the determined sensor values to the server and there all calculation operations are executed centrally.

A main advantage of the solution according to the invention is that each charging station or charging point can provide information on whether a charging point is occupied, what the utilization rate is, and when charging is expected to be possible. Mobile applications, vehicle navigation systems or other applications can use this information to predict exact routing and stops.

The charging points can be modified quickly, inexpensively and without conversion work, and expanded to include a considerable range of functions. In addition, the Charging Point Operator (abbreviated: CPO) does not need any further connection and transmission of the data of its charging points. Another advantage is that charging station information can be stored and retrieved centrally, eliminating the need for multiple decentralized systems and databases to hold information.

The FEM adapter can also be used to determine exactly whether a charging station is functioning correctly or whether it has, for example, sporadic failures or whether some vehicles cannot be charged correctly there (e.g., because the charging power is too low). This information is of great interest when selecting a possible next charging station or charging point in order to spend little time charging.

The aforementioned advantages help to increase customer satisfaction and remove the reluctance to purchase electrically powered vehicles. Further advantages and embodiments of the invention will be apparent from the description and the enclosed drawings.

It is understood that the features mentioned above and those to be explained below can be used not only in the combination indicated in each case, but also in other combinations or on their own, without leaving the scope of the present invention.

BRIEF DESCRIPTION OF THE FIGURES

The invention is illustrated schematically by means of embodiments in the drawings and is further described with reference to the drawings. Shown are.

DETAILED DESCRIPTION

Figure 1:
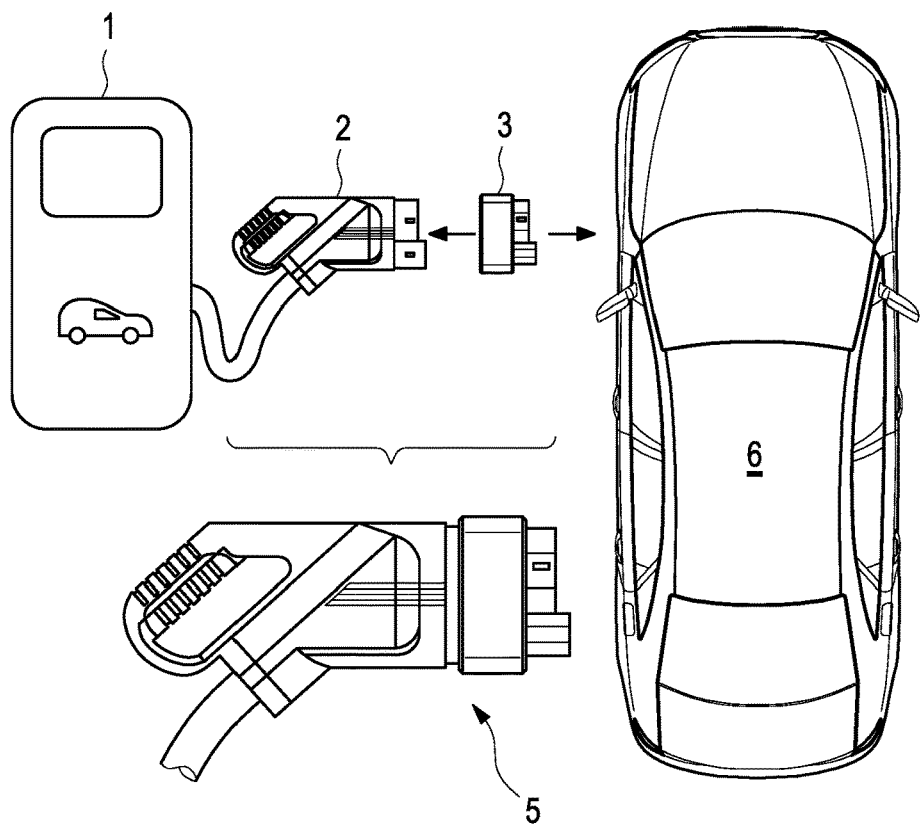
FIG. 1 the use of the FEM adapter according to the invention.

FIG. 1 illustrates the use of the FEM adapter according to the invention. The charging plug 2 of a stationary charging station 1 is fitted with an FEM adapter 3. This is plugged onto the charging plug 2 of the charging point 1 and forms a fixed unit 5 with the charging plug 2. This charging plug adapter unit 5 can then in turn be plugged into a charging socket of a vehicle 6 to be charged.

Figure 2:
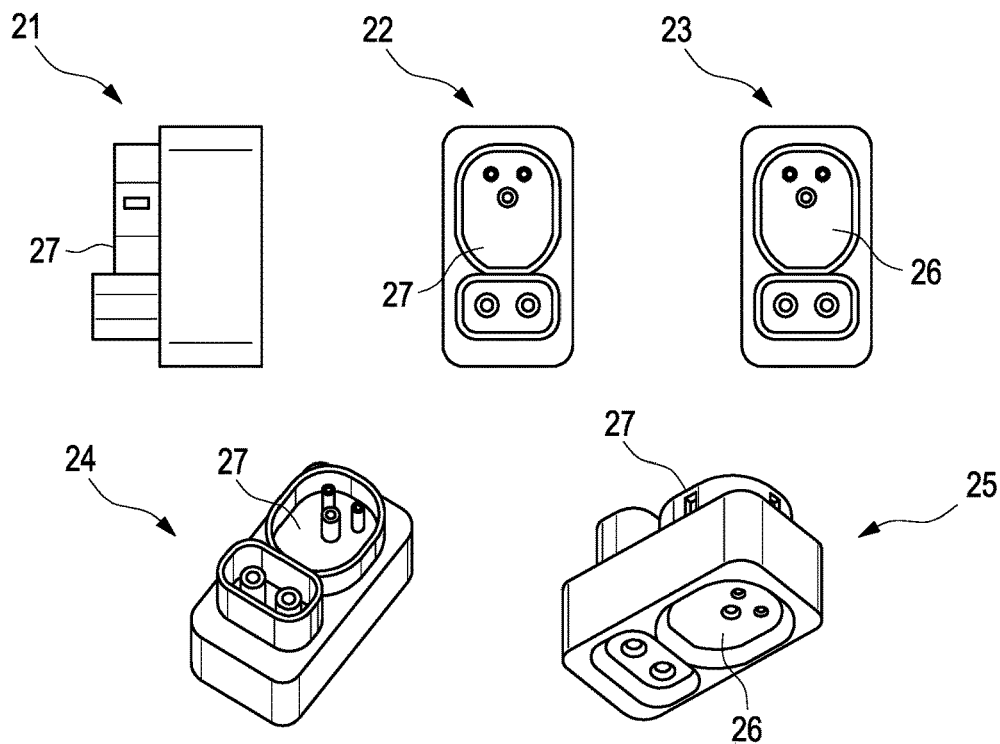
FIG. 2 various views of an embodiment of the FEM adapter according to the invention.

FIG. 2 shows a possible shape of this extension module. Shown are a side view 21, a front view 22, a rear view 23, a front perspective view 24, and a rear perspective view 25. Rear view 23 and perspective view from behind 25 show the receptacle 26 for the charging plug of the charging point. The side view 21, the front view 22 and the perspective view from the front 24 show the plug 27, which is plugged into the charging socket of the vehicle to be charged. Here, the FEM adapter is shown exemplary as ECE CCS (charging mode 4). The procedure is applicable to all types of plugs, both DC and AC.

Figure 3:
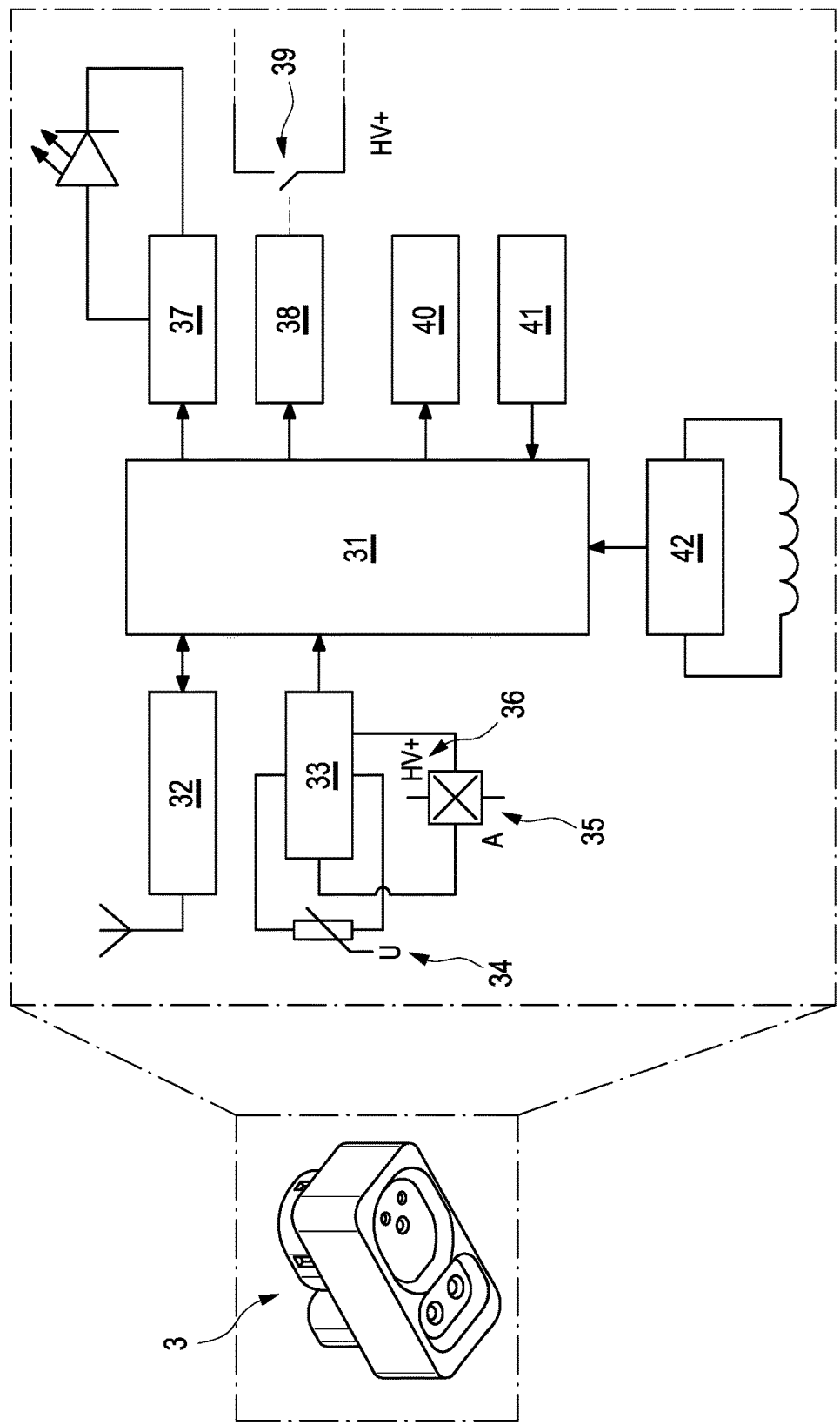
FIG. 3 a circuit diagram of an embodiment of the FEM adapter according to the invention.
Figure 3:
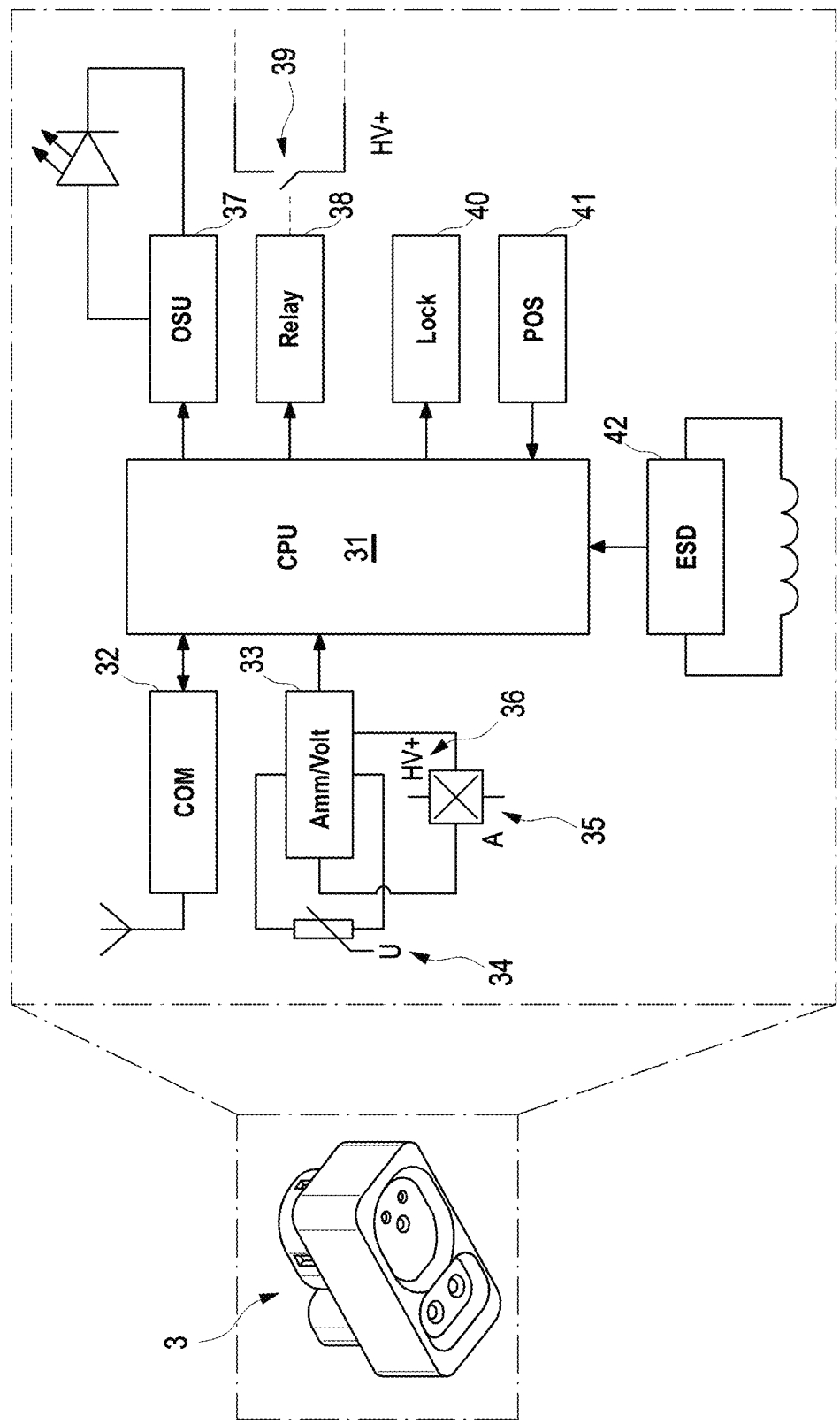

FIG. 3 shows a circuit diagram of an embodiment of the FEM adapter 3 according to the invention. The FEM adapter 3 contains various components, including at least one computing unit 31. The computing unit 31 processes all information and contains various algorithms, which will be discussed in more detail below. Furthermore, a telecommunication module 32 is connected, which communicates with a central database server via a suitable radio technology (symbolized by the antenna in the drawing). Various information is transmitted to this server, e.g. whether the charging station is occupied, whether charging is in progress and how much time the current charging process will take. In the same way, information can be received via the telecommunication module 32, e.g. whether the charging station is to be reserved. In order to determine the charging curve of the vehicle that is currently being charged, the FEM adapter 3 contains a current/voltage measuring unit 33 with at least one current sensor 35 and at least one voltage sensor 34. The current sensor 35 operates according to the Hall principle (contactless current detection via magnetic field generated by a current-carrying conductor). This current sensor 35 is arranged in the adapter 3 in such a way that the charging current of a line 36 (e.g. HV+ or HV−) flows through it (e.g. arranged around a plug contact). The voltage can be determined with the voltage sensor 34 according to the same principle. Using the measured current and voltage values, the computing unit 31 can determine how much time a charging process will still take. For this purpose, a charging curve of the currently charging vehicle is calculated. The algorithm is self-learning, i.e. the more frequently different vehicles charge at the charging point with the FEM adapter 3, the more accurate predictions can be made about which course different charging curves will take. This depends on several factors, e.g. charging voltage, charging current over time, and how the HV battery of the vehicle to be charged degrades the charging current. The remaining loading time is calculated from the determined values and transmitted to the server via the telecommunication module 32. There, this information can subsequently be retrieved by other systems, for example, to calculate an ideal route.

To ensure that the FEM adapter 3 and the charging plug 2 form a solid unit 5, the adapter 3 locks the charging plug 2 via a plug lock 40, in the same way as the charging plug 2 would be locked in a direct connection between charging station 1 and vehicle 6. Only an authenticated user (e.g. service personnel) can release this lock 40. This ensures that the adapter 3 is not removed without permission.

On the FEM adapter 3 itself there is an optical signal unit 37 (e.g. an LED strip, symbolized in the drawing by the light-emitting diode). This signals whether the charging station is operational and whether the charging point has been reserved by an application for an approaching electric vehicle. For this purpose, a reservation request for a specific time was sent to the adapter 3 in advance. As soon as such an order arrives at the adapter 3, the optical signal unit 37 is switched on and a relay 38 in the adapter 3 actively disconnects a voltage pin 39 (e.g. HV+ or HV−) just before the reservation time. Disconnecting the circuit makes it impossible for unauthenticated users and vehicles to charge at the charging point. In addition, it is stored on the central server that no other vehicle can be charged at the charging point for a certain period of time during which the vehicle is being charged.

There is also a position sensor 41 in the FEM adapter 3. This sensor 41 allows the adapter 3 to determine whether it is in or at the charging station or whether it is in a vehicle. This is especially important when a vehicle has actually finished charging, but the plug of the FEM adapter 3 is still in the vehicle's charging socket. Due to the lack of current flow, the FEM adapter 3 would otherwise not be able to detect whether the charging point is still occupied.

The power supply of the FEM adapter 3 is provided by a self-sufficient energy storage device 42. This can be recharged inductively by the strong electromagnetic field generated when charging the vehicle (in the charging cable and plug) (symbolized by the coil in the drawing).

LIST OF REFERENCE SIGNS

1 Charging station
2 Charging plug
3 FEM adapter
5 Interconnection of charging plug and FEM adapter
6 Vehicle
21 Side view FEM adapter
22 Front view FEM adapter
23 Rear view FEM adapter
24 Perspective view from the front of the FEM adapter
25 Perspective view from behind of the FEM adapter
26 Charging plug receptacle
27 Plug for vehicle charging socket
31 Computing unit
32 Telecommunications module
33 Current/voltage measuring unit
34 Voltage sensor
35 Current sensor
36 Electric line
37 Signal unit
38 Relay
39 HV pin
40 Plug lock
41 Position sensor
42 Energy storage device

The invention claimed is:

1. An adapter extending the functions of a charging station, comprising: a receptacle for a charging plug of the charging station, a plug for plugging into a charging socket of a motor vehicle, a current/voltage measuring unit and a telecommunications unit which is arranged for wireless data exchange with a server, wherein the adapter comprises a computing unit which is arranged to determine a charging curve of the motor vehicle from the measured values of the current/voltage measuring unit during a charging process of a motor vehicle connected to the charging station, to calculate a remaining charging time and to transmit this to the server via the telecommunications unit.

2. The adapter according to claim 1, which additionally comprises a plug lock controlled by the computing unit, by which the adapter can be locked to the charging plug to form a fixed unit that can only be released again by an authenticated user.

3. The adapter according to claim 1, which additionally comprises an optical signal unit controlled by the computing unit, which is arranged to signal whether the charging station is operational and whether the charging station has been reserved for an approaching electric vehicle.

4. The adapter of claim 3, wherein the optical signal unit comprises an LED strip.

5. The adapter according to claim 1, which comprises a relay controlled by the computing unit, with which an electrical connection of a voltage pin of the plug can be interrupted.

6. The adapter according to claim 1, which comprises a position sensor connected to the computing unit, and wherein the computing unit is arranged to determine from the data of the position sensor whether the adapter is located in or on the charging station or is inserted in the charging socket of the vehicle.

7. The adapter according to claim 1, which comprises an energy storage device for supplying voltage to the adapter.

8. The adapter according to claim 7, wherein the energy storage device is inductively rechargeable by the electromagnetic field generated when charging the vehicle.

9. A charging infrastructure comprising several charging stations each charging station with charging plugs equipped with an adapter according to claim 1, and a database server arranged for wireless communication with the adapters and with motor vehicles or their users.

10. The adapter according to claim 2, which additionally comprises an optical signal unit controlled by the computing unit, which is arranged to signal whether the charging station is operational and whether the charging station has been reserved for an approaching electric vehicle.

11. The adapter according to claim 2, which comprises a relay controlled by the computing unit, with which an electrical connection of a voltage pin of the plug can be interrupted.

12. The adapter according to claim 3, which comprises a relay controlled by the computing unit, with which an electrical connection of a voltage pin of the plug can be interrupted.

13. The adapter according to claim 4, which comprises a relay controlled by the computing unit, with which an electrical connection of a voltage pin of the plug can be interrupted.

14. The adapter according to claim 2, which comprises a position sensor connected to the computing unit, and wherein the computing unit is arranged to determine from the data of the position sensor whether the adapter is located in or on the charging station or is inserted in the charging socket of the vehicle.

15. The adapter according to claim 3, which comprises a position sensor connected to the computing unit, and wherein the computing unit is arranged to determine from the data of the position sensor whether the adapter is located in or on the charging station or is inserted in the charging socket of the vehicle.

16. The adapter according to claim 4, which comprises a position sensor connected to the computing unit, and wherein the computing unit is arranged to determine from the data of the position sensor whether the adapter is located in or on the charging station or is inserted in the charging socket of the vehicle.

17. The adapter according to claim 5, which comprises a position sensor connected to the computing unit, and wherein the computing unit is arranged to determine from the data of the position sensor whether the adapter is located in or on the charging station or is inserted in the charging socket of the vehicle.

18. The adapter according to claim 2, which comprises an energy storage device for supplying voltage to the adapter.

19. The adapter according to claim 3, which comprises an energy storage device for supplying voltage to the adapter.

* * * * *